United States Patent [19]

Eichen et al.

[11] Patent Number: 4,714,346
[45] Date of Patent: Dec. 22, 1987

[54] FREQUENCY CHIRPED INTERFEROMETRIC DISPLACEMENT SENSORS AND MECHANICAL TRANSLATION TIPS THEREFOR

[75] Inventors: Elliot Eichen, Arlington; Paul Melman, Newton, both of Mass.; Kenneth Cook, Troy, Mich.

[73] Assignees: GTE Laboratories Incorporated, Waltham, Mass.; GTE Valeron Corporation, Troy, Mich.

[21] Appl. No.: 909,816

[22] Filed: Sep. 22, 1986

[51] Int. Cl.⁴ .............................................. G01B 9/02
[52] U.S. Cl. ................................... 356/349; 356/358; 33/125 R; 33/172 E
[58] Field of Search ............. 356/349, 358; 33/172 E, 33/561, DIG. 4, 558, 125 R

[56] References Cited

U.S. PATENT DOCUMENTS

| | | | |
|---|---|---|---|
| 2,418,786 | 4/1947 | Nadig et al. | 356/345 |
| 4,420,260 | 12/1983 | Martinelli | 356/358 X |
| 4,475,812 | 10/1984 | Buczek et al. | 356/349 X |
| 4,538,911 | 9/1985 | Heynacher et al. | 356/363 X |
| 4,627,731 | 12/1986 | Waters et al. | 356/358 X |

*Primary Examiner*—Eugene R. LaRoche
*Assistant Examiner*—Seung Ham
*Attorney, Agent, or Firm*—Fred Fisher

[57] ABSTRACT

Mechanical translation tips can be attached to a fiber version of a frequency chirped interferometric displacement sensor. The mechanical tips can be used in noisy or deleterious environments that preclude the use of non-contact optical sensors. These tips can also be used with a hydraulic amplifier to increase the resolution of the sensor to less than one micron.

11 Claims, 5 Drawing Figures

FREQUENCY CHIRPED INTERFEROMETRIC DISPLACEMENT SENSORS AND MECHANICAL TRANSLATION TIPS THEREFOR

CROSS-REFERENCE RELATED APPLICATION

A copending U.S. patent application filed by Elliot G. Eichen and Paul Melman (two of the three co-inventors hereof), Ser. No. 840,308, entitled "Methods of and Apparatus for Measuring Distances", was filed on Mar. 17, 1986.

BACKGROUND OF THE INVENTION

1. Field of the Invention

This invention relates to frequency chirped interferometric displacement sensors and mechanical translation tips therefor. Accordingly, it is a general object of this invention to provide new and improved sensors and tips of such character.

2. General Background

As indicated in the related application, cited above, classical (or phase) interferometry is well known as a means of measuring distances that are less than or on the order of the wavelength of light. Surfaces with deviations several times the wavelength of light ($\lambda$), or with discontinuities greater than $\lambda$, cannot be measured without ambiguities of $2\pi$ in phase. Object translations greater than $\lambda$ can be measured by counting fringes or the number of cycles of a sinusoidal signal of fixed frequency.

In known prior art interferometric distance or profile measuring systems, the information pertaining to the optical path difference (OPD) between arms is contained in the phase of the interference pattern. There are data acquisition techniques, such as heterodyne (sometimes called phase shifting) interferometry-see U.S. Pat. No. 4,225,240 to Balasubramanian, "Method and System for Determining Interferometric Optical Path Length Difference", issued Sept. 30, 1980—in which a phase shifting or frequency shifting element is placed in one arm of the interferometer. See, also, Crane, R., *Interference Phase Measurements*, Applied Optics 538 (1969) and Shagan, R. N. and J. C. Wyant, *Optical Frequency Shifter for Heterodyne Interferometers Using Multiple Rotating Polarization Retarders*, Applied Optics 3034 (1978).

The foregoing are essentially fringe scanning interferometers in which the radiance pattern is modulated at a fixed frequency. The information is contained as a phase of that beat (fixed) frequency, and they are still beset by $2\pi$ ambiguities. A second technique used to extend interferometric measurement to larger OPD's is moiré interferometry in which two interferograms are overlayed (or moiréed) to form a third interferogram with a larger equivalent wavelength, as suggested by Moore, D. T. and B. E. Truax, *Phase-locked Moire Fringe Analysis for Automated Contouring of Diffuse Surfaces*, Applied Optics 18, 91, (1979). Moiré interferometry tends to be a complicated, expensive, and difficult to implement in real time method that has found limited usefulness.

In the frequency chirped interferometer, the frequency (wavelength) of the source is modulated (chirped), resulting in fringes whose frequency rather than phase is proportional to the OPD between arms. Thus, since there are no $2\pi$ ambiguities in phase, a frequency chirped interferometer is not limited to measuring distances of less than the wavelength of light, or to translations. Phase interferometry has fractional wavelength sensitivity with dynamic range (OPD's) on the order of wavelengths. Frequency chirped interferometers have a different scale; their dynamic range is on the order of meters and their resolutions are on the order of microns. Further, because there is an internal reference (the chirp rate), they measure absolute distance rather than comparative distance.

U.S. Pat. No. 2,418,786, issued to Nadig et al. on Apr. 8, 1947, relates to a hydraulic interferometer. It discloses an interferometer having a light source, an eyepiece, and means for reflecting the light from the source to the eye-piece in the form of interfering light beams. Its reflecting means includes a vertically movable horizontal mirror. A hydraulic system of the interferometer includes connected cylinders of substantially different cross-section, a piston in one cylinder carrying the movable mirror and a plunger adjustable in the other cylinder for effecting the movement of the piston.

U.S. Pat. No. 3,374,704 to Granger, issued Mar. 26, 1968, U.S. Pat. No. 3,656,853 to Bagley et al., issued Apr. 18, 1972; U.S. Pat. No. 3,744,909 to Bruce, issued July 10, 1973; U.S. Pat. No. 4,153,370 to Corey, III, issued on May 8, 1979; U.S. Pat. No. 4,347,441 to Dil et al., issued Aug. 31, 1982; U.S. Pat. No. 4,420,260 to Martinelli, issued Dec. 13, 1983; and U.S. Pat. No. 4,475,812 to Buczek et al., issued Oct. 9, 1984 all relate to interferometers.

It appears that all of the cited patents set forth above, though possibly relating to phase directed interferometers, do not suggest usage in frequency chirped interferometers.

SUMMARY OF THE INVENTION

Another object of this invention is to provide for a new and improved mechanical translation tip that can be attached to an optical fiber version of a frequency chirped interferometric displacement sensor.

Still another object of this invention is to provide for new and improved mechanical translation tips that can be used in noisy or deleterious environment that preclude the use of noncontact optical sensors.

Yet another object of this invention is provide for new and improved mechanical translation tips that can be used with a hydraulic amplifier to increase the resolution of an associated sensor to less than 1 micron.

Still yet another object of this invention is to provide for a new and improved frequency chirped interferometric displacement sensor which can be used in environments having an opaque transmission medium between the sensor and a test piece, or for use on extremely rough or low reflectivity surfaces.

In accordance with one aspect of the invention, a mechanical translation tip for a frequency chirped interferometric displacement sensor includes a tip member, an optical fiber, a reference surface, a lens, a bearing, and a housing. The tip member has a first surface adapted to engage a test surface, a second surface having high reflectivity, and an axial portion joining the surfaces. The bearing cooperates with the axial portion of the tip member for axial movement of the tip member therewithin. The housing engages the tip member, the bearing, the fiber, the reference surface, and the lens, whereby the housing is adapted to translationally engage the member so that the first surface is external to the housing and the second surface is internal to the housing. The bearing is fixedly held within the housing for axial movement for the tip member therewithin. The fiber and the lens are so oriented within the housing so that some of the light entering one of the ends of the fiber travels through the fiber, exiting from the other end, the exiting light from the other end being collimated by the lens and directed to the second surface. The collimated light from the lens is reflected back through the lens by the second surface of high reflectivity. The reflected back light is focused by the lens onto the other end of the fiber. The focused light is transmitted back through the one end of the fiber. The rest of the light traveling through the fiber is reflected back by the reference surface to the one end of the fiber. In accordance with certain features of the invention, the housing includes bias means for engaging the tip member for axial movement of the portion of the tip member with the housing. The housing can fixedly hold the fiber and the lens.

In accordance with another aspect of the invention, a mechanical translation tip for an interferometric displacement sensor includes a tip member, an optical fiber, a reference surface, a lens, a bearing, a liquid, a reflecting disc, and a housing. The tip member has a first surface adapted to engage a test surface, together with a second surface that has a planar area A, and an axial portion joining the surfaces. The bearing cooperates with the axial portion of the tip member for axial movement of the tip member therewithin. The bearing has a first liquid-bearing cavity therein having a cross-sectional area of A. The first liquid-bearing cavity has a first axial end that engages with the second surface of the tip member. The bearing has a second liquid-bearing cavity therewithin having a cross-sectional area of B, wherein A/B is greater than one. The second liquid-bearing cavity engages with a second axial end of the first liquid-bearing cavity. Liquid fills the first liquid-bearing cavity and partially fills the second liquid-bearing cavity. The housing engages the tip member, the bearing, the liquid, a reflecting disc which has a cross-sectional area of B, the fiber, the reflecting surface, and the lens, whereby the housing is adapted to translationally engage the member so that the first surface is external to the housing and the second surface is internal to the housing. The bearing is fixedly held within the housing for axial movement of the tip member therewithin. The liquid fills the first cavity and partially fills the second cavity, terminating in a meniscus. The reflecting disc is axially movable within the second cavity in engagement with the meniscus. The fiber and lens are so oriented within the housing means so that some of the light entering one of the ends of the fiber travels through the fiber, exiting from the other end, whereby the exiting light from the other end becomes collimated by the lens and directed to the second surface. The collimated light from the lens is reflected back through the lens by the reflecting disc. The reflected-back light is focused by the lens onto the other end of the fiber. The rest of the light traveling through the fiber is reflected by the reflecting surface to the one end of the fiber. The focused light is transmitted back through the one end of the fiber so that axial movement of the tip member by a distance X causes the reflecting disc to axially move a distance AX/B. In accordance with certain features of the invention, the fiber is fixedly held by the housing and the lens is fixedly held by the housing.

In accordance with yet another aspect of the invention, a frequency chirped interferometric displacement sensor utilizing a mechanical translation tip includes a tip member, an optical fiber, a reflecting surface, a lens, a bearing, a housing, and a detector. The tip member has a first surface for engaging a test surface, a second surface having high reflectivity, and an axial portion that joins the two surfaces. The housing engages the optical fiber, the reflecting surface, the lens, the bearing, and the tip member therewithin whereby the housing is adapted to translationally engage the member so that the first surface is external to the housing and the second surface is internal to the housing. The bearing is fixedly held within the housing for axial movement of the tip member therewithin. The fiber and the lens are so oriented within the housing so that light that enters one end of the fiber travels therethrough to exit from the other end. The exiting light from that other end is collimated by the lens and is directed to the second surface, the collimated light from the lens being reflected back through the lens by the second surface of high reflectivity. The reflected-back light is focused by the lens onto the other end of the fiber. The focused light is transmitted back to the one end of the fiber. A frequency chirped laser provides frequency modulated light. A beam splitter, coupled to receive the frequency modulated light, directs light along a first path to one end of the fiber and also directs light along a second path, whereby frequency modulated light travels from the laser to the beam splitter, directly through the second path, and also light travels from the laser to the beam splitter along the first path through the fiber in one direction, reflected by the second surface of the tip member, through the fiber in the opposite direction, to the beam splitter along the second path. A detector receives both the direct and the reflected light. In accordance with certain features of the invention, the housing holds the tip member by spring biasing means. The fiber can be fixedly held by the housing means and the lens can be fixedly held by the housing means.

BRIEF DESCRIPTION OF THE DRAWINGS

Other objects, advantages, and features of this invention, together with its construction and mode of operation, will become more apparent from the following description, when read in conjunction with the accompanying drawings, in which.

DESCRIPTION OF PREFERRED EMBODIMENTS

Some applications for interferometric displacement sensors preclude the use of a noncontact optical device. For example: environments with an opaque transmission medium between the sensor and the test piece (such as machine tooling systems in which the machined piece is constantly bathed in cooling liquid, or the combustion chamber of a jet engine), or for use in extremely rough or low reflectivity surfaces. In such cases, a mechanical translation tip that is added to the frequency chirped interferometric displacement sensor can be desired for contacting the test surface.

Figure 1:
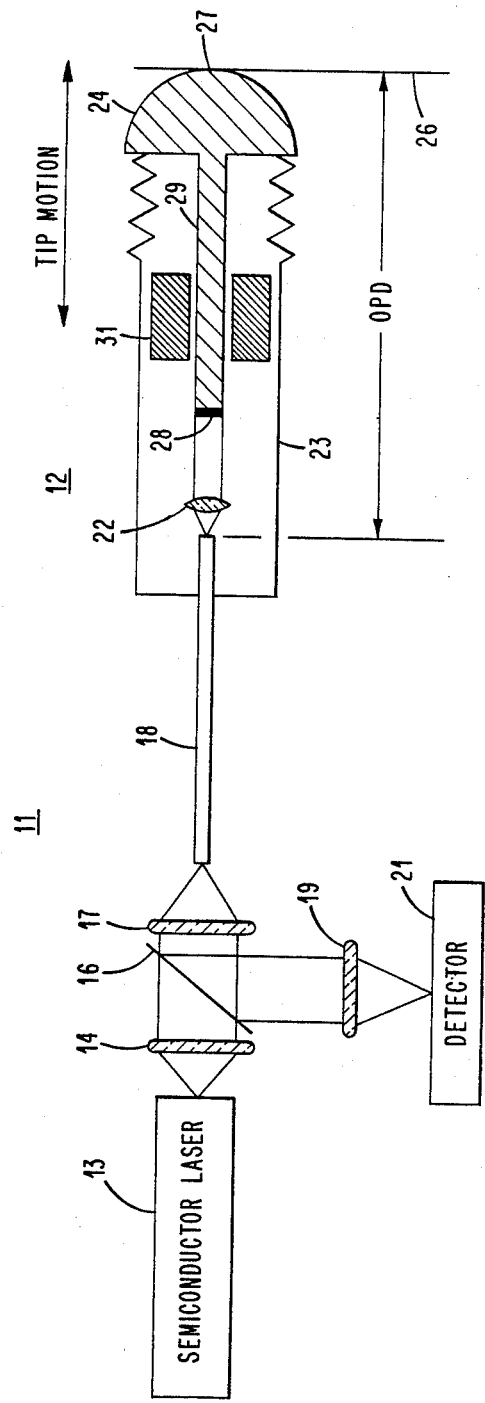
FIG. 1 is a schematic diagram of a frequency chirped interferometric displacement sensor with mechanical translation tip in accordance with one embodiment of this invention.

Referring to FIG. 1, in which such a design is indicated, there is depicted a frequency chirped interferometric displacement sensor 11 together with a mechanical translation tip 12 therefor. The sensor 11 includes a semiconductor laser 13. Its output light is collimated by a lens 14 toward a beam splitter 16.

Part of the collimated light that is directed onto the beam splitter 16 is transmitted to a focusing lens 17 to the end of an optical fiber 18. Other portions of the light are focused by a lens 19 which directs the light to a detector 21.

The light that enters the fiber 18 is directed therealong to an exiting collimating lens 22 which is fixedly held in a housing 23. The housing 23 also retains the fiber 18 in place.

The housing 23 is sealed to protect the optics 22 and the optical beam from the environment. A mechanical tip 24 is adapted to touch a test surface 26 by an end 27. The tip 24 has a reflecting surface 28 at its other end which reflects light back into the fiber 18 through its reference surface 118 via the lens 22.

The tip 24 contains an axial shaft 29 between the ends 27, 28 that is supported for translational movement by a bearing 31 fixedly held by the housing 23.

The foregoing contact type probe utilizing the tip 24 is desirable over a free beam that may be used as a test arm. Note, that as the reflecting surface 28 is affixed to the arm 29, the reflecting surface 28 translates axially along with the movement of the tip 24, and translates perpendicular to the wavefront of the beam that is being impinged thereupon. The surface 28 reflects the light inside the housing 23; the opposite surface 27, outside of the housing 23, comes into contact with the test surface 26.

Figure 2:
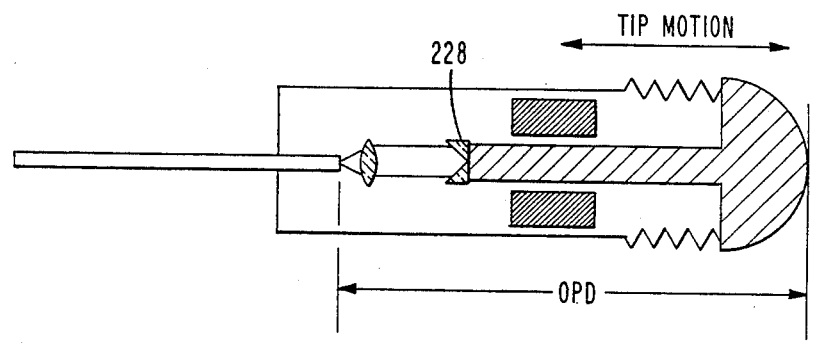
FIG. 2 is a design of a mechanical tip member using a corner cube reflector.
Figure 3:
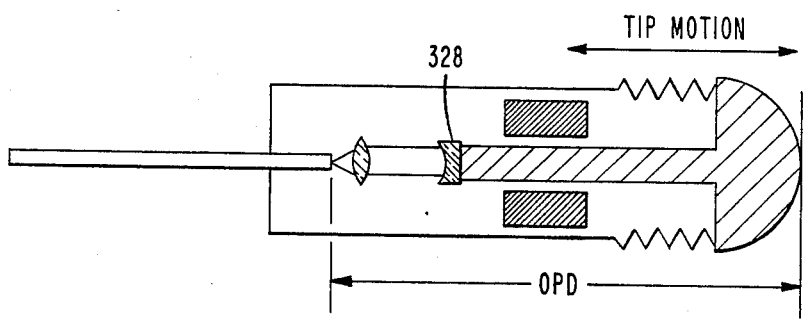
FIG. 3 is another schematic view of a mechanical tip member utilizing a spherical or aspherical reflector.
Figure 4:
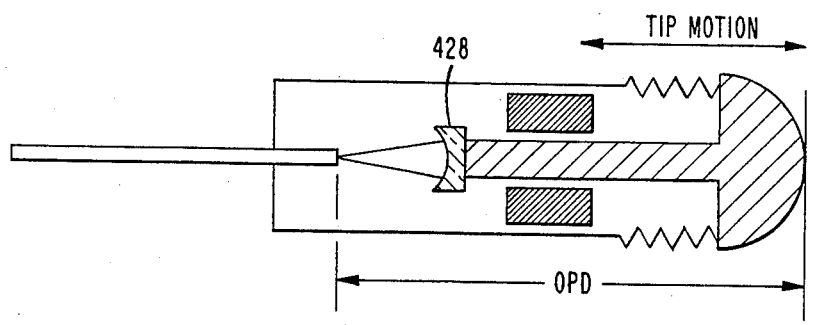
FIG. 4 is an alternate schematic view of mechanical tip member in accordance with this invention utilizing a special reflector in lieu of a lens.

The tip 24 can have various shapes for different purposes. Likewise, the reflecting surface can have various shapes. It can have a flat reflecting surface, as indicated in FIG. 1; a corner cube reflector 228, as shown in FIG. 2; a spherical or aspherical type reflecting surface 328, as shown in FIG. 3, or a spherical or aspherical surface 428 which focuses reflected light back into the end of the fiber 18 through its reference surface 418, as indicated in FIG. 4.

The foregoing are a variety of optical designs that may be used to increase the amount of light in the return beam, decrease the tolerances on alignment, and reduce the number of optical components that are necessary. Another feature that can be added to the tip, for increasing the resolution of the sensor so that its accuracy is to within one micron, would be the addition of a hydraulic amplifier as depicted in FIG. 5.

Figure 5:
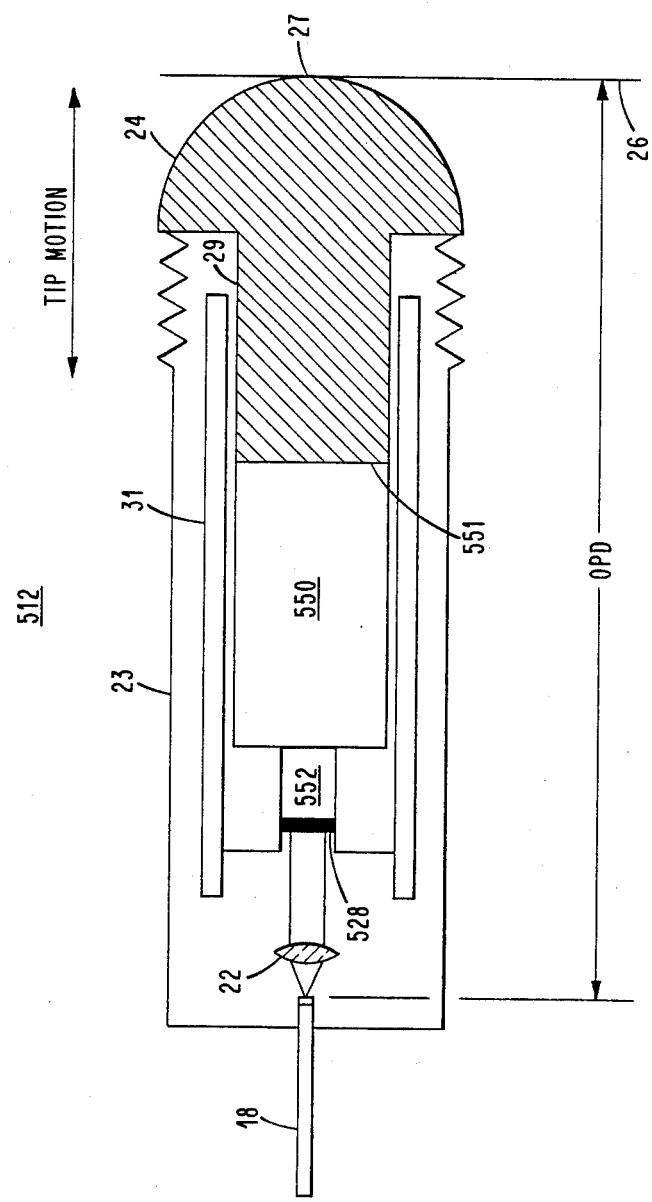
FIG. 5 is a schematic view in accordance with yet another embodiment of the invention illustrating a mechanical tip member with a hydraulic amplifier.

FIG. 5 depicts an overall mechanical tip 512 including a tip member 24 for contacting the test surface 26 with its front end 27. An axial portion 29 reciprocates within a bearing 31. The bearing 31 has a first liquid-bearing cavity 550 therewithin having a cross-sectional area corresponding to the cross-section of the axial portion 29 of the tip member 24. The first liquid-bearing cavity 550 has a first axial end in engagement with the tip member 24 along a plane 551. The first liquid-bearing cavity 550 has a second axial end that engages with a second liquid-bearing cavity 552 within the bearing 31. The second liquid-bearing cavity 552 has a cross-sectional area of B wherein A/B is greater than 1. The second liquid-bearing cavity is in engagement with the second axial end of the first liquid-bearing cavity 550.

A suitable liquid, such as mercury, fills the first liquid-bearing cavity 550 and partially fills the second liquid-bearing cavity 552.

A reflecting disc 528, having a cross-sectional area of B, engages the liquid in the second liquid-bearing cavity 552 by way of surface tension. Thus, the housing 23 is adapted to translationally engage the tip member 24 so that the first surface 27 is external to the housing 23 and the second surface at the plane 551 is internal to the housing 23. The bearing 31 is fixedly held within the housing 23 for axial movement for the tip member 24 therewithin. The mercury (or other suitable liquid) fills the first cavity 550 within the housing 23 for axial movement of the tip member 24 therewithin. The mercury fills the first cavity and partially fills the second cavity, terminating in a meniscus. The reflecting disc 528 axially moves within the second cavity 552 in surface-tension engagement with the meniscus. The fiber 18 and the lens 22 are so oriented within the housing 23 that light entering one of the ends of the fiber 18 travels through the fiber 18, exiting from the other end of the fiber. The exiting light from the other end of the fiber, being collimated by the lens and directed to the second surface, is reflected back through the lens by the reflecting disc, the reflected-back light being focused by the lens onto the other end of the fiber. The focused light is transmitted back through the one end of the fiber whereby axial movement of the tip member causes the reflecting disc to axially move a distance A/B magnification.

Thus, it has been shown that the use of a mechanical tip in conjunction with a frequency chirped interferometrics sensor isolates the optics and the optical beam from local environment, enabling a test piece to be physically contacted.

Various tip designs, as indicated in FIGS. 1 through 4, optimize the amount of light reflected back into the fiber, thereby reducing the number of optical components and further decreasing tolerances on alignment.

Phase shifting interferometers of the known prior art operate on a basis of change in phase of a fixed frequency. The phase is different but the frequency remains the same. In contrast, the instant invention discusses changes of one frequency to another frequency (e.g., a higher frequency). The concept of frequency chirped interferometers, however, is discussed in the copending application referred to above. This invention is directed to frequency based interferometers as distinguished from phase based interferometers. Matter that are applicable only to frequency based interferometers and not to phase based interferometers include the use of an in-line reference surface to provide a calibrated frequency component, for example. Another example: all the individual tips as indicated in FIGS. 1 through 5 can travel distances greater than the wavelength of light. It is not mandatory that the tips travel greater than the wavelength of light; they can travel, also, less than the wavelength of light. However, there is no ambiguity when they travel greater than the wavelength of light (contrariwise, known prior art devices provide ambiguous signals).

It is further noted that all the tips used herein are combined with an optical fiber, which does not appear to be true with the cited prior art references. To clarify the foregoing, a frequency based interferometer can measure distances up to pluralities of wavelength of light. A phased based interferometer can measure light up to one wavelength of light, and, if it is desired to measure light that is a bit longer, it is necessary to count each individual wavelength, whereas, with a frequency based interferometer, light can be measured from a fraction of a wavelength (which can be microns) up to higher distances, in the neighborhood of meters. Light is not being measured; the distance of wavelength is being measured. An interferometer in accordance with this invention measures distances. Hence, measurements of separate wavelengths can be made up to tens of meters.

Hence, it will be apparent that various modifications can be made without departing from the spirit and scope of this invention.

What is claimed is:

1. A mechanical translation tip for a frequency chirped interferometric displacement sensor comprising
  a tip member having
    a first surface adapted to engage a test surface,
    a second surface having high reflectivity, and
    an axial portion joining said surfaces;
  an optical fiber having two ends;
  a reference surface;
  a lens;
  a bearing in cooperation with said portion for axial movement of said tip member therewithin; and
  housing means for engaging said tip member, said bearing, said fiber, said reference surface, and said lens therewithin, whereby
    said housing means is adopted to translationally engage said member so that said first surface is external to said housing means and said second surface is internal to said housing means,
    said bearing is fixedly held within said housing means for axial movement of said tip member therewithin, and
    said fiber and said lens are so oriented within said housing means whereby some of the light entering one of said ends of said fiber travels through said fiber, exiting from the other of said ends, said exiting light from said other end being collimated by said lens and directed to said second surface, the collimated light from said lens being reflected back through said lens by said second surface of high reflectivity, the reflected back light being focused by said lens onto said other end of said fiber, the focused light being transmitted back through said one end of said fiber, and whereby the rest of the light traveling through said fiber is reflected back by said reference surface to said one end of said fiber.

2. The mechanical translation tip as recited in claim 1 whereby said housing means includes biasing means for engaging said tip member for axial movement of said portion of said tip member within said housing means.

3. The mechanical translation tip as recited in claim 2 wherein said fiber is fixedly held by said housing means.

4. The mechanical translation tip as recited in claim 3 wherein said lens is fixedly held by said housing means.

5. A mechanical translation tip for an interferometric displacement sensor comprising
  a tip member having
    a first surface adapted to engage a test surface,
    a second surface having a planar area A; and
    an axial portion joining said surfaces;
  an optical fiber having two ends;
  a reference surface;
  a lens;
  bearing means in cooperation with said portion of said tip member for axial movement of said tip member therewithin,
    said bearing means having a first liquid-bearing cavity therewithin having a cross-sectional area of said A,
      said first liquid-bearing cavity having a first axial end in engagement with said second surface of said tip member, and
      said first liquid-bearing cavity having a second axial end,
    said bearing means having a second liquid-bearing cavity therewithin having a cross-sectional area of B, wherein A/B is greater than one,
      said second liquid-bearing cavity being in engagement with said second axial end of said first liquid-bearing cavity;
  liquid filling said first liquid-bearing cavity and partially filling said second liquid-bearing cavity,
  a reflecting disc having a cross-sectional area of said B;
  housing means for engaging said tip member, said bearing, said liquid, said disc, said fiber, said reference surface, and said lens, whereby
    said housing means is adapted to translationally engage said member so that said first surface is external to said housing means and said second surface is internal to said housing means,
    said bearing is fixedly held within said housing means for axial movement of said tip member therewithin,
    said liquid fills said first cavity and partially fills said second cavity terminating in a meniscus,
    said reflecting disc is axially movable within said second cavity in engagement with said meniscus, and
    said fiber and said lens are so oriented within said housing means whereby some of the light entering one of said ends of said fiber travels through said fiber, exiting from the other of said ends, said exiting light from said other end being collimated by said lens and directed to said second surface, the collimated light from said lens being reflected back through said lens by said reflecting disc, the reflected back light being focused by said lens onto said other end of said fiber, the focused light being transmitted back through said one end of said fiber, and whereby the rest of the light traveling through said fiber is reflected back by said reflecting surface to said one end of said fiber, whereby
    axial movement of said tip member a distance X causes said reflecting disc to axially move a distance AX/B.

6. The mechanical translation tip as recited in claim 5 wherein said fiber is fixedly held by said housing means and wherein said lens is fixedly held by said housing means.

7. A frequency chirped interferometric displacement sensor utilizing a mechanical translation tip, comprising
  a tip member having
    a first surface for engaging a test surface,
    a second surface having high reflectivity, and
    an axial portion joining said surfaces;
  an optical fiber having two ends;
  a reference surface;

a lens;

a bearing;

housing means for engaging said optical fiber, said reference surface, said lens, said bearing, and said tip member therewithin, whereby said housing is adapted to translationally engage said member so that said first surface is external to said housing and said second surface is internal to said housing, said bearing is fixedly held within said housing for axial movement of said tip member therewithin, said fiber and said lens are so oriented within said housing whereby some of the light entering one of said ends of said fiber travels therethrough to exit from the other of said ends, said exiting light from said other end being collimated by said lens and directed to said second surface, the collimated light from said lens being reflected back through said lens by said second surface of high reflectivity, the reflected back light being focused by said lens onto said other end of said fiber, the focused light being transmitted back to said one end of said fiber, and whereby the rest of the light traveling through said fiber is reflected back by said reflecting surface to said one end of said fiber;

a frequency chirped laser for provided frequency modulated light;

a beam splitter, coupled to said provided frequency modulated light, for directing light along a first path to said one end of said fiber and along a second path, whereby frequency modulated light travels from said laser to said beam splitter directly through said second path, and light travels from said laser, to said beam splitter, along said first path, through said fiber in one direction, reflected by said second surface of said tip member, through said fiber in the opposite direction, to said beam splitter, along said second path; and a detector for receiving both the direct and reflected light.

8. The sensor as recited in claim 7 wherein said housing means holds said tip member by biasing means.

9. The sensor as recited in claim 8 wherein said fiber is fixedly held by said housing means.

10. The sensor as recited in claim 9 wherein said lens is fixedly held by said housing means.

11. A frequency chirped interferometric displacement sensor utilizing a mechanical translation tip, comprising a tip member having a first surface for engaging a test surface, a second surface, and an axial portion joining said surfaces;

an optical fiber having two ends;

a reference surface;

a reflecting member;

a bearing;

housing means for engaging said optical fiber, said reference surface, said reflecting member, said bearing, and said tip member therewithin, whereby said housing is adapted to translationally engage said member so that said first surface is external to said housing and said second surface is internal to said housing, said bearing is fixedly held within said housing for axial movement of said tip member therewithin, said fiber and said reflecting member are so oriented within said housing whereby some of the light entering one of said ends of said fiber travels therethrough to exit from the other of said ends, said exiting light from said other end being reflected by said reflecting member and directed back to said fiber, the reflected back light being focused by said reflecting member onto said other end of said fiber, the focused light being transmitted back to said one end of said fiber, and whereby the rest of the light traveling through said fiber is reflected back by said reflecting surface to said one end of said fiber;

a frequency chirped laser for provided frequency modulated light;

a beam splitter, coupled to said provided frequency modulated light, for directing light along a first path to said one end of said fiber and along a second path, whereby frequency modulated light travels from said laser to said beam splitter directly through said second path, and light travels from said laser, to said beam splitter, along said first path, through said fiber in one direction, reflected by said reflecting member, through said fiber in the opposite direction, to said beam splitter, along said second path; and a detector for receiving both the direct and reflected light.

* * * * *